(12) United States Patent
Gao et al.

(10) Patent No.: US 10,191,564 B2
(45) Date of Patent: Jan. 29, 2019

(54) SCREEN CONTROL METHOD AND DEVICE

(71) Applicant: Xiaomi Inc., Beijing (CN)

(72) Inventors: Yi Gao, Beijing (CN); Hongqiang Wang, Beijing (CN); Yunyuan Ge, Beijing (CN)

(73) Assignee: Xiaomi Inc., Beijing (CN)

( * ) Notice: Subject to any disclaimer, the term of this patent is extended or adjusted under 35 U.S.C. 154(b) by 236 days.

(21) Appl. No.: 15/223,281

(22) Filed: Jul. 29, 2016

(65) Prior Publication Data
US 2017/0060266 A1 Mar. 2, 2017

(30) Foreign Application Priority Data

Aug. 31, 2015 (CN) .......................... 2015 1 0547144

(51) Int. Cl.
*G06F 3/0346* (2013.01)
*G06F 1/16* (2006.01)
(Continued)

(52) U.S. Cl.
CPC ....... *G06F 3/0346* (2013.01); *G02B 27/0172* (2013.01); *G02B 27/0179* (2013.01);
(Continued)

(58) Field of Classification Search
CPC ........ G06F 3/017; G06F 3/011; G06F 1/3265; G06F 1/163
See application file for complete search history.

(56) References Cited

U.S. PATENT DOCUMENTS

2009/0195497 A1 8/2009 Fitzgerald et al.
2011/0264928 A1 10/2011 Hinckley
(Continued)

FOREIGN PATENT DOCUMENTS

CN 101980516 A 2/2011
CN 103399642 A 11/2013
(Continued)

OTHER PUBLICATIONS

Extended European Search Report received from European Patent Office for European Application No. 16184796.7, dated Dec. 14, 2016 (12 pages).
(Continued)

*Primary Examiner* — Abbas I Abdulselam
(74) *Attorney, Agent, or Firm* — Finnegan, Henderson, Farabow, Garrett & Dunner LLP

(57) ABSTRACT

A screen control method is provided. The method includes: detecting, by a mobile terminal, a moving direction of the mobile terminal; detecting, by the mobile terminal, an orientation of a screen of the mobile terminal; receiving, by the mobile terminal, posture information sent by a wearable device, the posture information including a palm orientation of a user of the mobile terminal; sending, by the mobile terminal, a screen recognition instruction to smart glasses when each of the moving direction, the orientation of the screen, and the palm orientation is in a first direction; powering on the screen when screen recognition success information sent by the smart glasses is received; and powering off the screen when each of the moving direction, the orientation of the screen, and the palm orientation is in a second direction, the second direction being different from the first direction.

18 Claims, 16 Drawing Sheets

(51) Int. Cl.
*G06F 1/32* (2006.01)
*G06F 3/01* (2006.01)
*G06F 3/03* (2006.01)
*G02B 27/01* (2006.01)
*G09G 5/00* (2006.01)

(52) U.S. Cl.
CPC ............ *G06F 1/163* (2013.01); *G06F 1/1694* (2013.01); *G06F 1/3215* (2013.01); *G06F 1/3231* (2013.01); *G06F 1/3265* (2013.01); *G06F 3/011* (2013.01); *G06F 3/017* (2013.01); *G06F 3/0304* (2013.01); *G09G 5/006* (2013.01); *G02B 2027/014* (2013.01); *G02B 2027/0178* (2013.01); *G02B 2027/0187* (2013.01); *G06F 2200/1637* (2013.01); *G09G 2330/027* (2013.01); *Y02D 10/153* (2018.01); *Y02D 10/173* (2018.01)

(56) References Cited

U.S. PATENT DOCUMENTS

| | | | |
|---|---|---|---|
| 2015/0016674 A1 | 1/2015 | Cho et al. | |
| 2015/0169038 A1* | 6/2015 | Kim | G06F 1/3265 345/173 |
| 2015/0302823 A1* | 10/2015 | Lee | G09G 5/006 345/2.1 |
| 2016/0035082 A1* | 2/2016 | King | G06F 17/211 348/135 |
| 2016/0147300 A1* | 5/2016 | Liao | H04M 1/7253 345/156 |
| 2016/0328021 A1 | 11/2016 | Lee et al. | |

FOREIGN PATENT DOCUMENTS

| | | |
|---|---|---|
| CN | 103581443 A | 2/2014 |
| CN | 103927117 | 7/2014 |
| CN | 104090649 | 10/2014 |
| CN | 104765551 | 7/2015 |
| CN | 104808800 | 7/2015 |
| CN | 105183156 | 12/2016 |
| EP | 2824541 A1 | 1/2015 |
| EP | 2846318 A1 | 3/2015 |
| JP | 2013207574 A | 10/2013 |
| JP | 2014057129 A | 3/2014 |
| KR | 20150007643 | 1/2015 |
| WO | WO 2015/11178 A1 | 7/2015 |

OTHER PUBLICATIONS

International Search Report for Application No. PCT/CN2015/099598, dated Jun. 13, 2016, 12 pages.
International Preliminary Report on Patentability for International Application No. PCT/CN2015/099598, dated Mar. 6, 2018, 15 pages.

* cited by examiner

SCREEN CONTROL METHOD AND DEVICE

CROSS-REFERENCE TO RELATED APPLICATION

This application is based upon and claims priority of Chinese patent application No. 201510547144.3, filed Aug. 31, 2015, which is incorporated herein by reference in its entirety.

TECHNICAL FIELD

The present disclosure is related to the field of communication technology and, more particularly, to a screen control method and device.

BACKGROUND

With the development of communication technology, mobile phones have been widely used by users in daily life. When a mobile phone is in a standby mode, a user may power off the screen to save power, and when the user uses the mobile phone again, the user usually needs to press a button on the mobile phone to turn on the screen.

SUMMARY

According to a first aspect of the present disclosure, there is provided a screen control method, comprising: detecting, by a mobile terminal, a moving direction of the mobile terminal; detecting, by the mobile terminal, an orientation of a screen of the mobile terminal; receiving, by the mobile terminal, posture information sent by a wearable device, the posture information including a palm orientation of a user of the mobile terminal; sending, by the mobile terminal, a screen recognition instruction to smart glasses when each of the moving direction, the orientation of the screen, and the palm orientation is in a first direction; powering on the screen when screen recognition success information sent by the smart glasses is received; and powering off the screen when each of the moving direction, the orientation of the screen, and the palm orientation is in a second direction, the second direction being different from the first direction.

According to a second aspect of the present disclosure, there is provided a screen control method, comprising: initiating, by smart glasses, a screen recognition operation when a screen recognition instruction sent by a mobile terminal is received; acquiring, by the smart glasses, an image within a field of view of the smart glasses; determining, by the smart glasses, whether the image contains a screen of the mobile terminal; generating, by the smart glasses, screen recognition success information when the image contains the screen of the mobile terminal; and sending, by the smart glasses, the screen recognition success information to the mobile terminal.

According to a third aspect of the present disclosure, there is provided a mobile terminal, comprising: a processor; and a memory configured to store instructions executable by the processor. The processor is configured to: detect a moving direction of the mobile terminal; detect an orientation of a screen of the mobile terminal; receive posture recognition information sent by a wearable device, the posture information including a palm orientation of a user of the mobile terminal; send a screen recognition instruction to smart glasses when each of the moving direction, the orientation of the screen, and the palm orientation is in a first direction; power on the screen when screen recognition success information sent by the preset smart glasses is received; and power off the screen when each of the moving direction, the orientation of the screen, and the palm orientation is in a second direction, the second preset direction being different from the first preset direction.

According to a fourth aspect of the present disclosure, there is provided a smart terminal, comprising: a processor; and a memory configured to store instructions executable by the processor. The processor is configured to: start a screen recognition operation when a screen recognition instruction sent by a mobile terminal is received; acquire an image within a field of view of the smart terminal; determine whether the image contains a screen of the mobile terminal; generate screen recognition success information when the image contains the screen of the mobile terminal; and send the screen recognition success information to the mobile terminal.

It should be understood that both the foregoing general description and the following detailed description are only exemplary and explanatory and are not restrictive of the disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
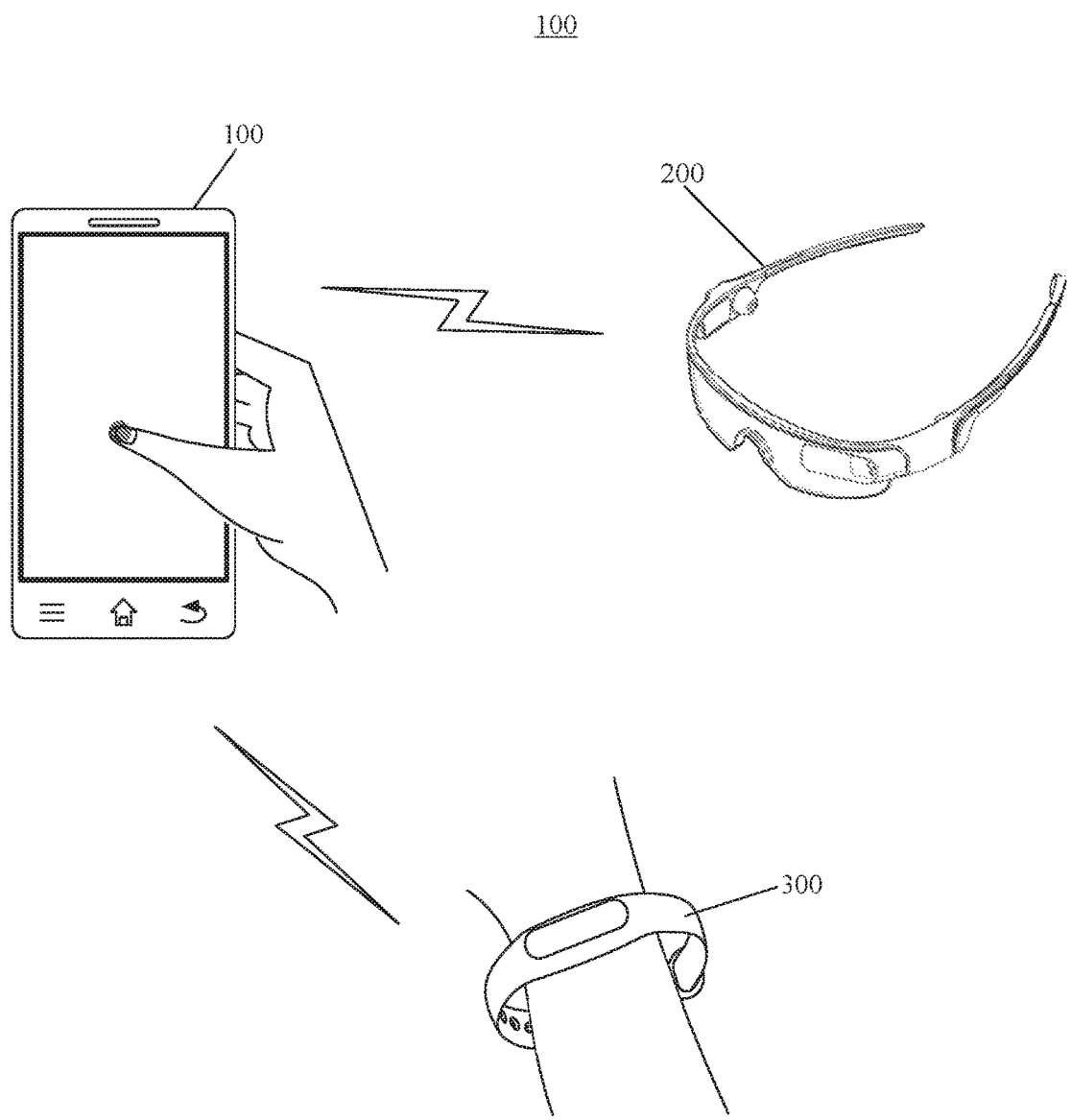
FIG. 1 is a schematic diagram illustrating a system environment, according to an exemplary embodiment.

FIG. 1 is a schematic diagram illustrating a system environment 100, according to an exemplary embodiment. Referring to FIG. 1, the system environment 100 includes a mobile terminal 100, smart glasses 200, and a wearable device 300, where the mobile terminal 100 may communicate with the smart glasses 200 and the smart bracelet 300 via a wireless network such as Bluetooth and the like. The mobile terminal 100 in FIG. 1 is depicted as a mobile phone, and the mobile terminal 100 may be any other mobile device, such as a tablet device or the like. The wearable device 300 in FIG. 1 is depicted as a smart bracelet, and the wearable device 300 may be any other wearable wristband device, such as a smart watch or the like.

In some implementations, when a user holds and operates the mobile terminal 100, if the mobile terminal 100 moves, a gravity sensor in the mobile terminal 100 may detect a gravity value of the mobile terminal 100, and the mobile terminal 100 may determine its moving direction according to the gravity value. In some implementations, the wearable device 300 is equipped with an acceleration sensor. The smart bracelet 300 may recognize posture information of the user according to a value detected by the acceleration sensor and send the posture information to the mobile terminal 100. For example, the posture information may include a user's palm orientation.

In some implementations, when the mobile terminal 100 moves in an upward direction and when the user's palm faces up, the mobile terminal 100 may send a screen recognition instruction to the smart glasses 200. When receiving the screen recognition instruction sent by the mobile terminal 100, the smart glasses 200 may initiate a screen recognition operation according to the screen recognition instruction to detect whether a current field of view of the smart glasses 200 contains the mobile terminal 100. If the current field of view of the smart glasses 200 contains the mobile terminal 100, the smart glasses 200 may send recognition success information to the mobile terminal 100, and the mobile terminal 100 may power on the mobile terminal screen according to the recognition success information sent by the smart glasses 200.

When the mobile terminal 100 moves upward, and when both the orientation of the mobile terminal screen and the user's palm orientation are upward, it likely indicates that the user is operating the mobile terminal 100 to bring toward the user's face. It may then be determined that the user likely intends to view the mobile terminal. The screen recognition operation by the smart glasses 200 further improves the determination accuracy of whether the user intends to view the mobile terminal, allowing the screen of the mobile terminal 100 to be powered on without requiring the user to press a specific button on the mobile terminal.

When the mobile terminal 100 moves downward, and when both the orientation of the mobile terminal screen and the user's palm orientation are downward, it likely indicates that the user need not view the mobile terminal 100 anymore, and accordingly, the screen of the mobile terminal 100 need not be powered on. If the screen of the mobile terminal 100 is powered on at the moment, it may be configured to power off.

Figure 2:
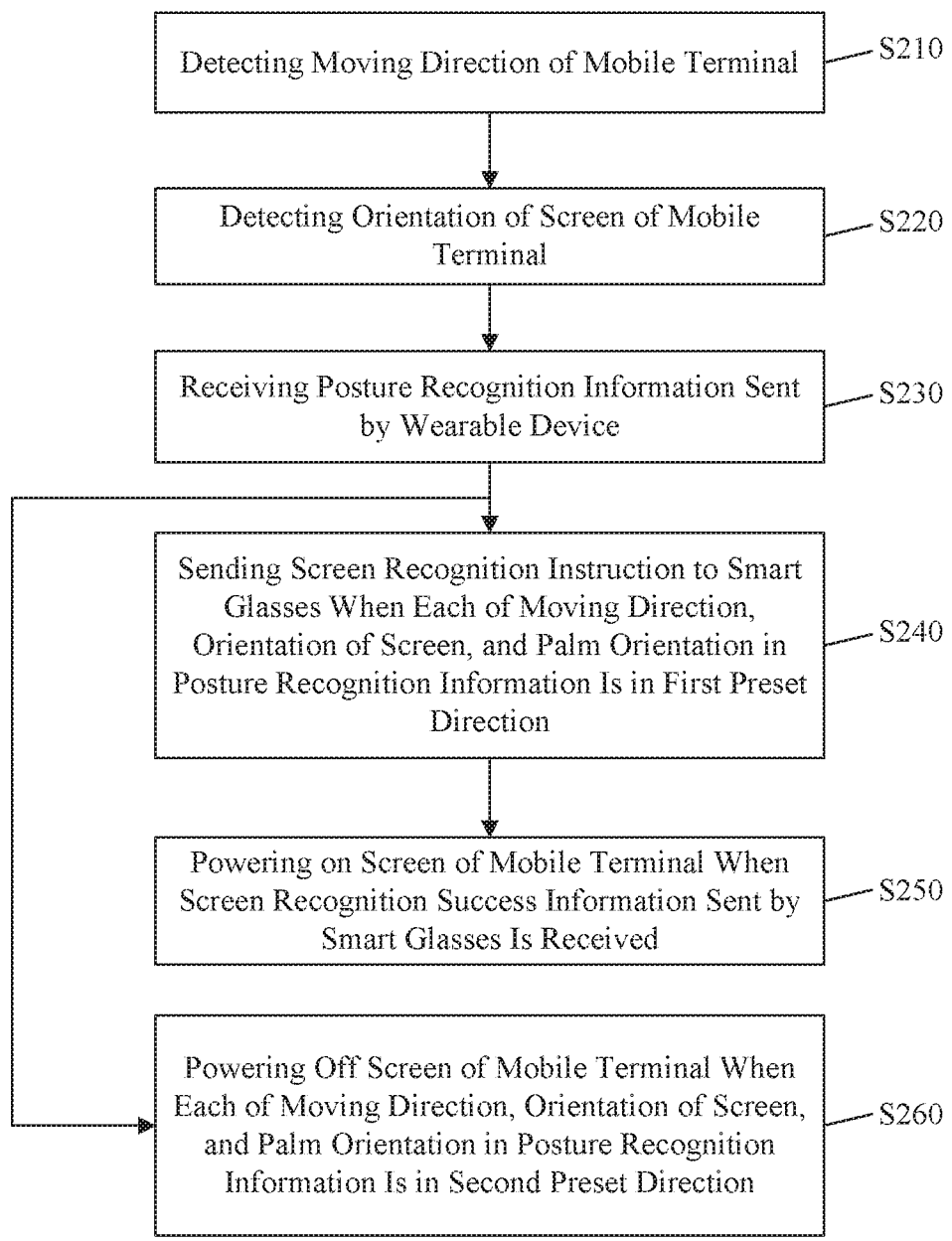
FIG. 2 is a flowchart of a screen control method, according to an exemplary embodiment.

FIG. 2 is a flowchart of a screen control method 200, according to an exemplary embodiment. The method 200 may be performed by a mobile terminal, such as a mobile phone, a tablet device, an e-book or the like. Referring to FIG. 2, the method 200 may include the following steps.

In step S210, the mobile terminal detects a moving direction of the mobile terminal.

For example, a sensor, such as an acceleration sensor, may be included in a mobile phone, and the mobile phone may detect its moving direction according to information detected by the sensor.

In step S220, the mobile terminal detects an orientation of a screen of the mobile terminal.

In some embodiments, the orientation of the screen may be classified into an upward direction and a downward direction. For example, in a mobile phone, whether the orientation of the screen is upward or downward may be determined based on the information detected by the acceleration sensor. The orientation of the screen may be in other direction, such as being leftward or rightward relative to the user, which is not limited by the present disclosure.

In step S230, the mobile terminal receives posture information sent by a wearable device. The posture information may include a palm orientation of a user of the mobile terminal. The wearable device may be a smart wearable device worn on a user's wrist, such as a smart bracelet, a smart watch or the like. In some embodiments, the wearable device may include an acceleration sensor and may recognize whether the waist of the user rotates by acquiring information detected by the acceleration sensor so as to determine the orientation of the user's palm. The position of the wearable device relative to the user's wrist may be fixed as the wearable device is worn on the user's wrist. For example, it may be seen from FIG. 1 that the position of the upper end of the wearable device 300 relative to the user's back of the hand may stay fixed. Thus, rotation information of the wearable device, such as a rotation direction, may be detected through an acceleration sensor in the wearable device, and the user's wrist orientation and palm orientation may be also obtained accordingly.

In step S240, the mobile terminal sends a screen recognition instruction to smart glasses when each of the moving direction, the orientation of the screen, and the palm orientation in the posture information is in a first preset direction.

For example, the first preset direction is a direction towards the user's face, indicating that the user intends to operate the mobile terminal to view information on the screen, and a screen recognition instruction may be sent to the smart glasses so as to determine whether a visual field of the smart glasses worn by the user contains the mobile terminal.

In step S250, the mobile terminal powers on the screen of the mobile terminal when screen recognition success information is received from the smart glasses.

For example, the screen recognition success information may include information that the smart glasses detect the user's eyeballs looking at the mobile terminal. If the user's eyes are closed, or the user's eyeballs are not looking at the mobile terminal, it likely indicates that the user does not intend to view or operate the mobile terminal, and thus, there is no need to power on the screen of the mobile terminal.

If the mobile terminal receives the screen recognition success information sent by the smart glasses, combining the moving direction of the mobile terminal, the orientation of the screen and the user's palm orientation, it indicates that the user is holding the mobile terminal to move towards his face and the user's eyes are looking at the mobile phone. Thus, the mobile terminal may determine that the user intends to view or operate the mobile terminal, and the screen of mobile terminal may be powered on without requiring the user to press a specific button.

In step S260, the mobile terminal powers off the screen of the mobile terminal when each of the moving direction, the orientation of the screen, and the palm orientation in the posture recognition information is in a second preset direction.

For example, the second preset direction is a direction away from the user's face, indicating that the user no longer needs to view or operate the mobile terminal e. If the screen of the mobile terminal is currently in the on state, without requiring the user to press a specific button, the screen may be powered off to save power of the mobile terminal.

In the method 200, the first preset direction is different from the second preset direction. For example, the first preset direction may represent a direction towards the user's face such as an upward direction, and the second preset direction may represent a direction away from the user's face such as a downward direction. In some implementations, the horizontal plane where the mobile terminal is located may be used as a boundary. When the mobile terminal moves above the horizontal plane, it may be determined that the mobile terminal moves upward, and vice versa. If the mobile terminal moves along the horizontal plane direction, it may be determined that the moving direction of the mobile terminal is in the horizontal direction, i.e. neither moving upward nor moving downward. The orientation of the screen of the mobile terminal may be determined based on an angle between a plane where the screen of the mobile terminal is located and the horizontal plane where the mobile terminal is located.

By determining that the user needs to view or operate the mobile terminal based on the moving direction of the user, the orientation of the screen and the palm orientation of the user and powering on the screen of the mobile terminal, the method 200 avoids the need for the user to press a specific key of the mobile terminal in order to power on the screen and improves the determination accuracy of the user's need to power on the screen. Further, By determining that the user no longer needs to view or operate the mobile terminal based on the moving direction of the user, the orientation of the screen and the palm orientation of the user and powering off the screen of the mobile terminal, the method 200 avoids the need for the user to press a specific key of the mobile terminal in order to power off the screen and lengthens the battery life of the mobile terminal.

Figure 3:
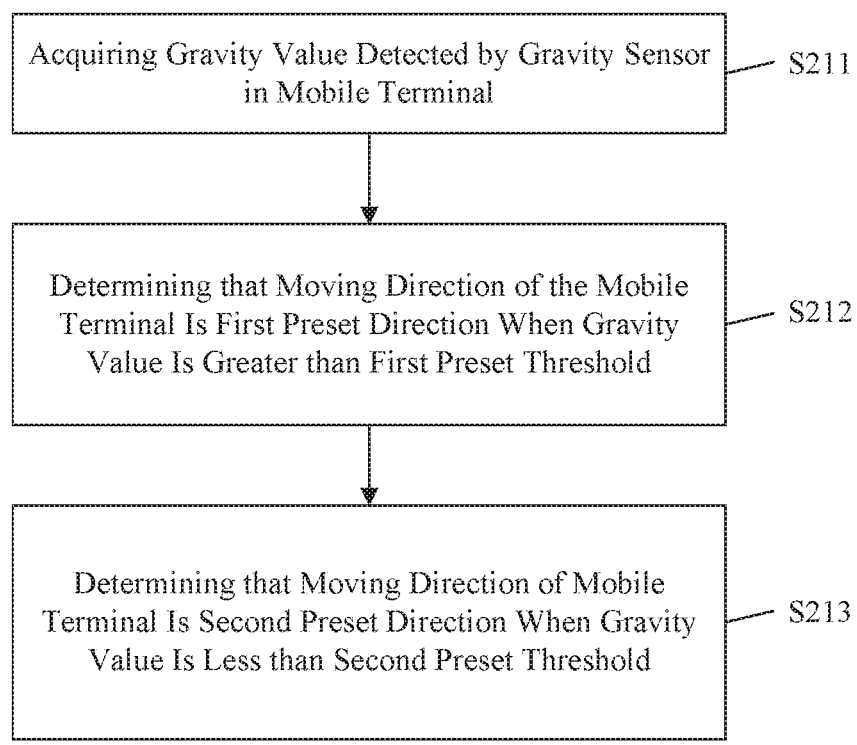
FIG. 3 is a flowchart of a method for detecting a moving direction of a mobile terminal, according to an exemplary embodiment.

FIG. 3 is a flowchart of a method 300 for detecting a moving direction of a mobile terminal, according to an exemplary embodiment. The method 300 may be performed by a mobile terminal and implemented in step S210 described in connection with FIG. 2. Referring to FIG. 3, the method 300 may include the following as follows.

In step S211, the mobile terminal acquires a gravity value detected by a gravity sensor in the mobile terminal.

Figure 4:
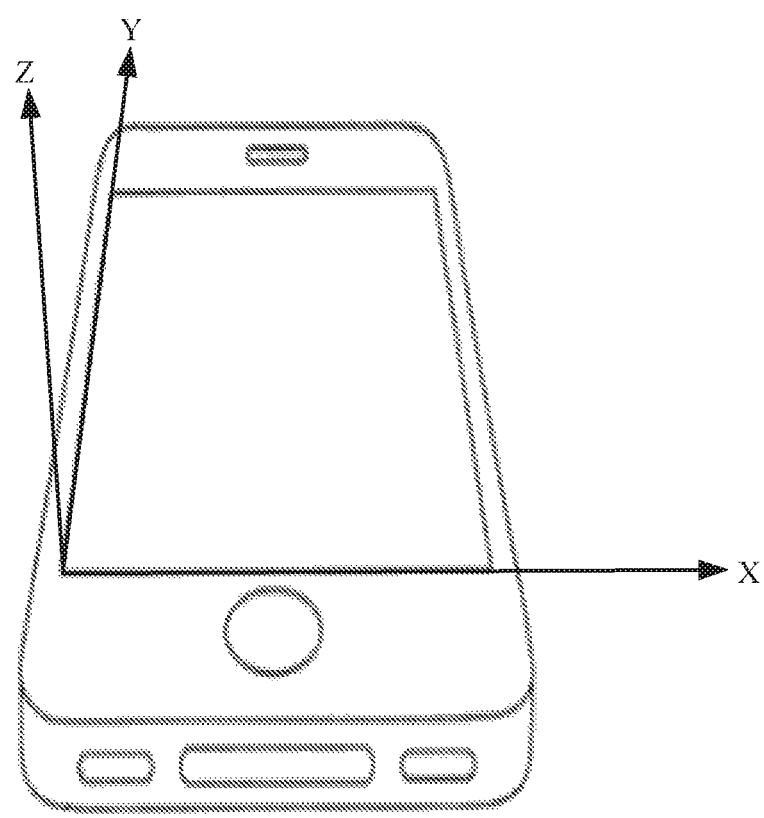
FIG. 4 is a schematic diagram illustrating a gravity value of a mobile terminal, according to an exemplary embodiment.

FIG. 4 is a schematic diagram 400 illustrating a gravity value of a mobile terminal, according to an exemplary embodiment. As shown in FIG. 4, the gravity sensor may detect gravity values of tri-axis (x, y, z), of the mobile terminal.

In step S212, the mobile terminal determines that the moving direction of the mobile terminal is the first preset direction when the gravity value is greater than a first preset threshold.

In step S213, the mobile terminal determines that the moving direction of the mobile terminal is the second preset direction when the gravity value is less than a second preset threshold. The first preset threshold may be set to be greater than the second preset threshold.

For example, the moving direction of the mobile terminal may be determined according to a z-axis gravity value detected by the gravity sensor. If the z-axis gravity value is greater that the first preset threshold, it may be determined that the mobile terminal moves in the first preset direction, and if the z-axis gravity value is less than the second preset threshold, it may be determined that the mobile terminal moves in the second preset direction.

As another example, if the z-axis gravity value is greater that a predetermined positive value, it may be determined that the mobile terminal moves in an upward direction, and if the z-axis gravity value is less than a predetermined negative value, it may be determined that the mobile terminal moves in a downward direction. Thus, the moving direction of the mobile terminal may be accurately and efficiently determined according to the gravity value detected by the gravity sensor in the mobile terminal.

Figure 5:
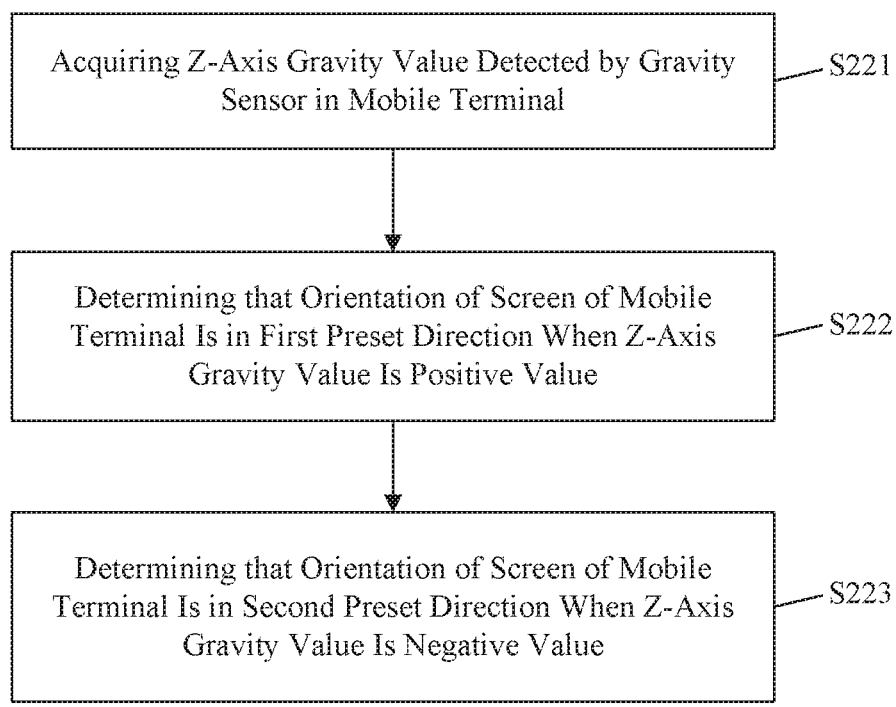
FIG. 5 is a flowchart of a method for detecting an orientation of a screen of a mobile terminal, according to an exemplary embodiment.

FIG. 5 is a flowchart of a method 500 for detecting an orientation of a screen of a mobile terminal, according to an exemplary embodiment. The method 500 may be performed by a mobile terminal and implemented in step S220 described in connection with FIG. 2. Referring to FIG. 5, the method 500 may include the following steps.

In step S211, the mobile terminal acquires Z-axis gravity value detected by a gravity sensor in the mobile terminal.

In step S222, the mobile terminal determines that the orientation of the screen of the mobile terminal is the first preset direction when the Z-axis gravity value is a positive value. For example, when the z-axis gravity value is a positive value, it may be determined that the orientation of the screen of the mobile terminal is in an upward direction.

In step S223, the mobile terminal determines that the orientation of the screen of the mobile terminal is the second preset direction when the Z-axis gravity value is a negative value. For example, when the z-axis gravity value is a negative value, it may be determined that the orientation of the screen of the mobile terminal is in a downward direction.

Figure 6:
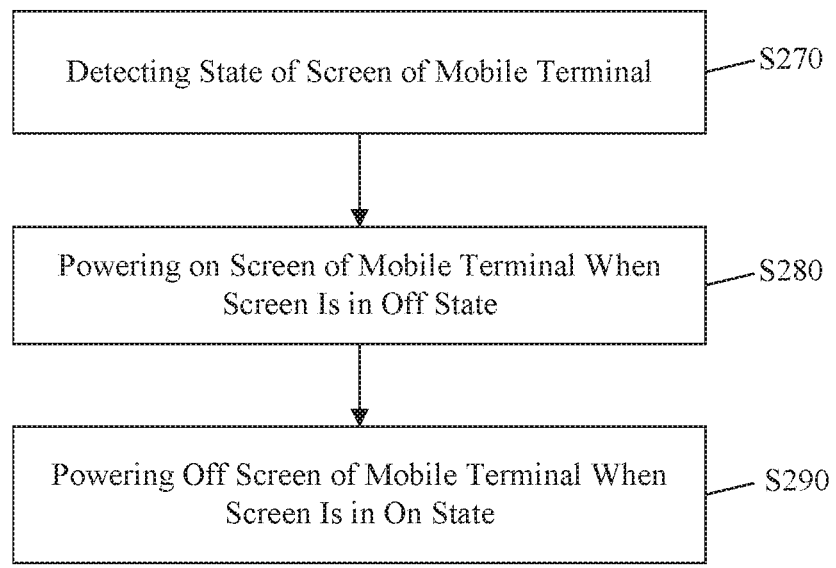
FIG. 6 is a flowchart of another screen control method, according to an exemplary embodiment.

FIG. 6 is a flowchart of another screen control method 600, according to an exemplary embodiment. The method 600 may be performed by a mobile terminal and implemented as a part of the method 200 (FIG. 2). Referring to FIG. 6, the method 600 may include the following steps.

In step S270, the mobile terminal detects a state of the screen of the mobile terminal.

In step S280, the mobile terminal powers on the screen of the mobile terminal when the screen is in the off state.

In step S290, the mobile terminal powers off the screen of the mobile terminal screen when the screen is in the on state.

For example, if the user is holding the mobile terminal to move toward the user's face, and the mobile terminal receives the screen recognition success information sent by the smart glasses, it may be determined that the user intends to view or operate the mobile terminal, and the state of the screen of the mobile terminal may be detected. If the current state of the screen is off, the mobile terminal may power on the screen, and if the current state of the screen is on, no action may need to be taken with respect to the screen.

As another example, if the user is holding the mobile terminal to move away from the user's face, it may be determined that the user no longer needs to view or operate the mobile terminal, whether the state of the screen of the mobile terminal is in the off state may be detected. If the screen of the mobile terminal is not in the off state, the mobile terminal may power off the screen, and if the screen of the mobile terminal is in the off state, no action may need to be taken with respect to the screen.

Figure 7:
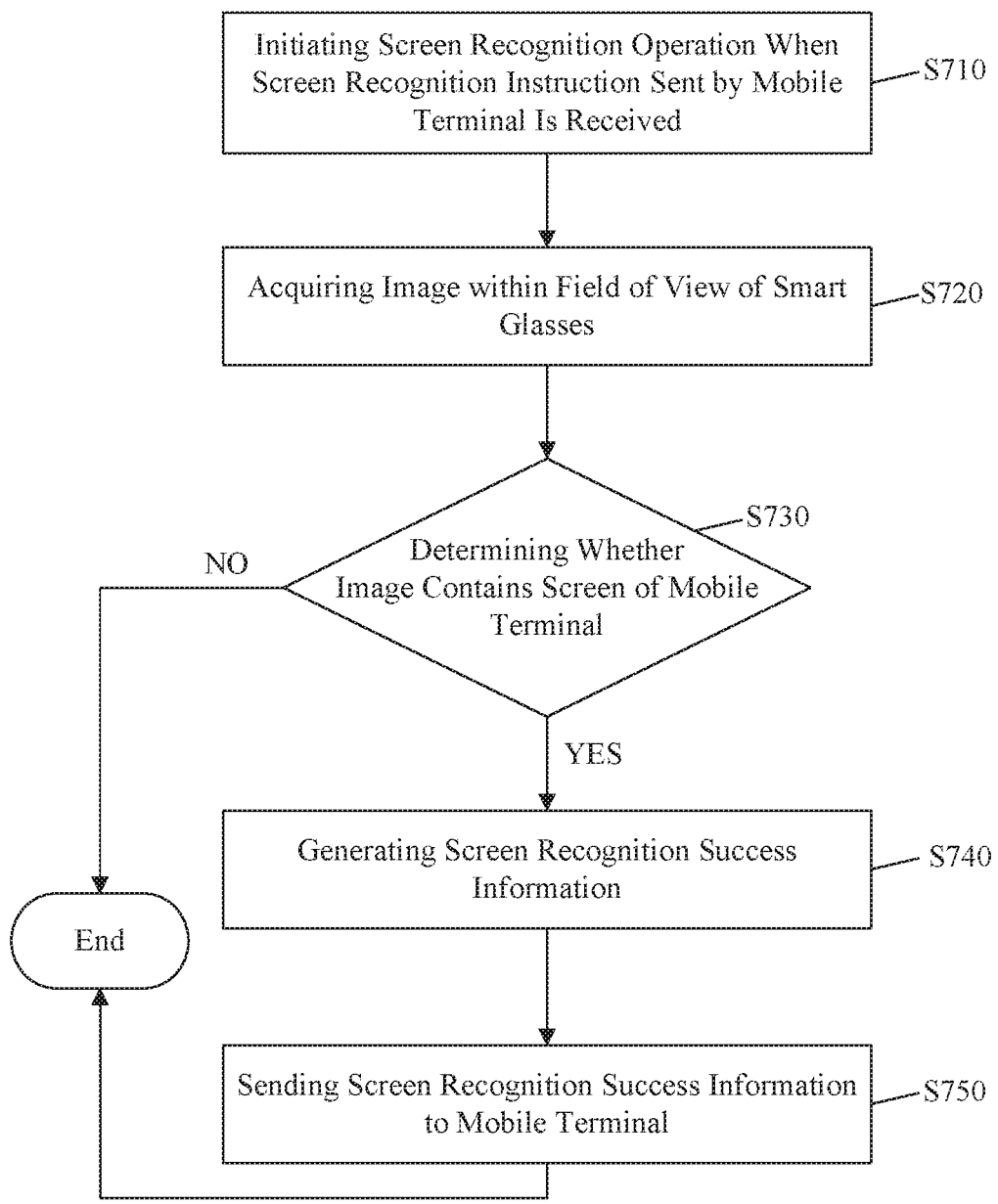
FIG. 7 is a flowchart of another screen control method, according to an exemplary embodiment.

FIG. 7 is a flowchart of another a screen control method 700, according to an exemplary embodiment. The method 700 may be performed by smart glasses. Referring to FIG. 7, the method 700 includes the following steps.

In step S710, the smart glasses initiate a screen recognition operation when a screen recognition instruction sent by a mobile terminal is received.

In some embodiments, the smart glasses and the mobile terminal may be pre-bound, and may communicate with each other via Bluetooth or other communication technology. When receiving the screen recognition instruction sent by the mobile terminal, the smart glasses initiate the screen recognition operation, such as enabling a camera, and the like.

In step S720, the smart glasses acquire an image within a field of view of the smart glasses. For example, the smart glasses may capture an image of the view the user is looking at by performing an eyeball tracking technology.

In step S730, the smart glasses determine whether the image contains a screen of the mobile terminal. When the smart glasses capture the image by performing the eyeball tracking technology, the field of view in the image may be relatively narrow, and whether the user is looking at the screen of mobile terminal may be recognized.

Figure 8:
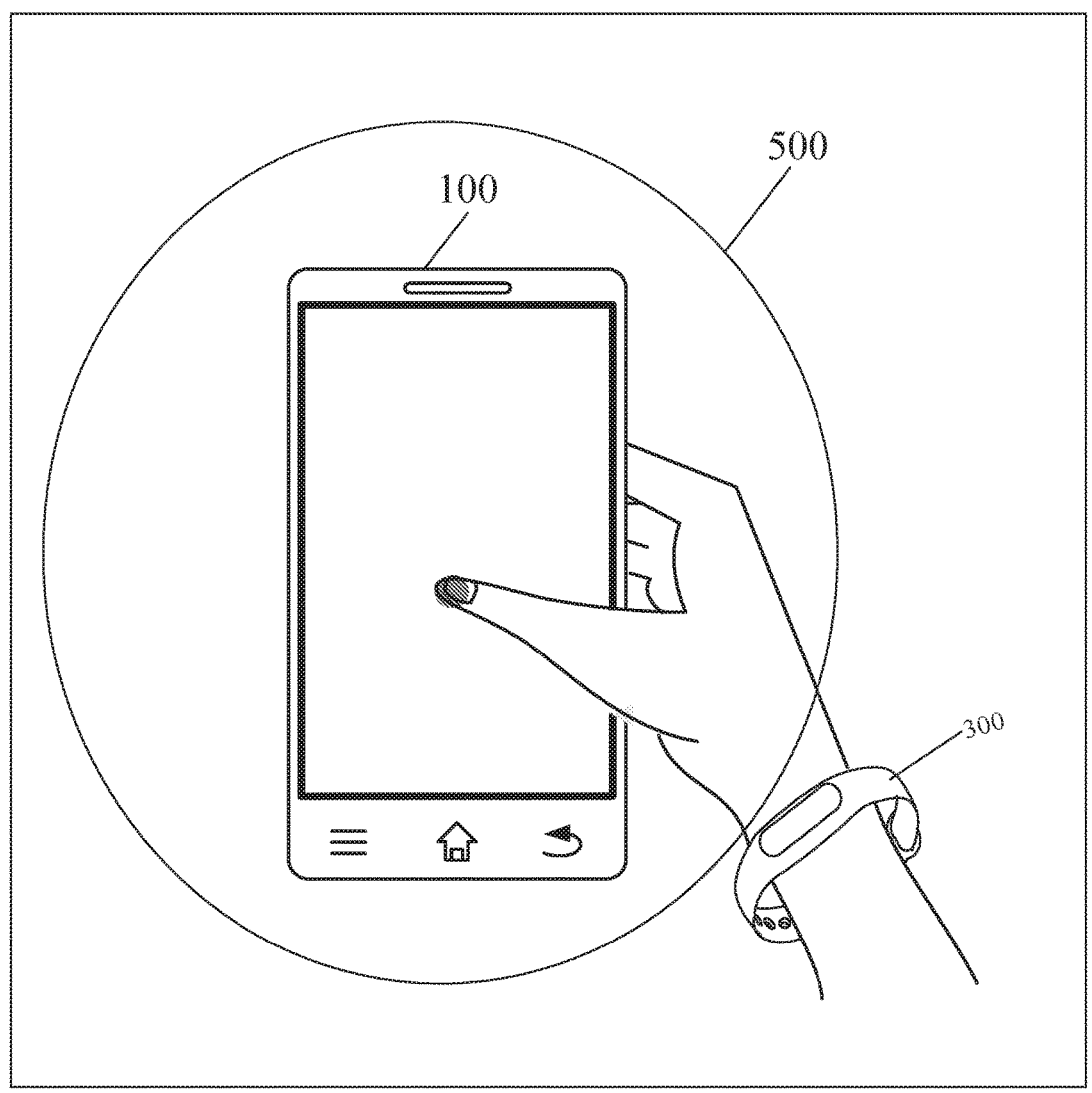
FIG. 8 is a schematic diagram illustrating an image captured by smart glasses, according to an exemplary embodiment.

In some embodiments, the smart glasses enable the camera to capture objects within the field of view, and the objects contained in the image may include additional objects to the screen of the mobile terminal. Since the smart glasses move along with the movement of the user's head, and the relative position of the smart glasses to the user's head is unchanged, a target area in the image may be obtained, and it may be determined whether the target area contains the screen of the mobile terminal. For example, the target area may have a preset area size and center around a central position of the image. FIG. 8 is a schematic diagram illustrating an image 800 captured by the smart glasses, according to an exemplary embodiment. As shown in FIG. 8, the target area 500 centers around the central position of the image 800 captured by the smart glasses and contains the screen of the mobile terminal 100.

When the image contains the screen of the mobile terminal, step S740 is performed.

In step S740, the smart glasses generate screen recognition success information.

In step S750, the smart glasses send the screen recognition success information to the mobile terminal.

In some embodiments, the mobile terminal may determine whether the user's eyes are in a closed state. If the user's eyes are in a closed state, it may be determined that the user does not intend to view or operate the mobile terminal, and the execution of method 700 may end. If the smart glasses recognize that the mobile terminal in the image does not include a screen of the mobile terminal but includes a side or back of the mobile terminal, it may be determined that the user does not intend to view or operate the mobile terminal, and the execution of method 700 may end.

In the method 700, by capturing an image of the field of view of the smart glasses, whether the user is looking at the screen of the mobile terminal may be determined and screen recognition success information may be sent to the mobile terminal for performing corresponding screen control operation.

Figure 9:
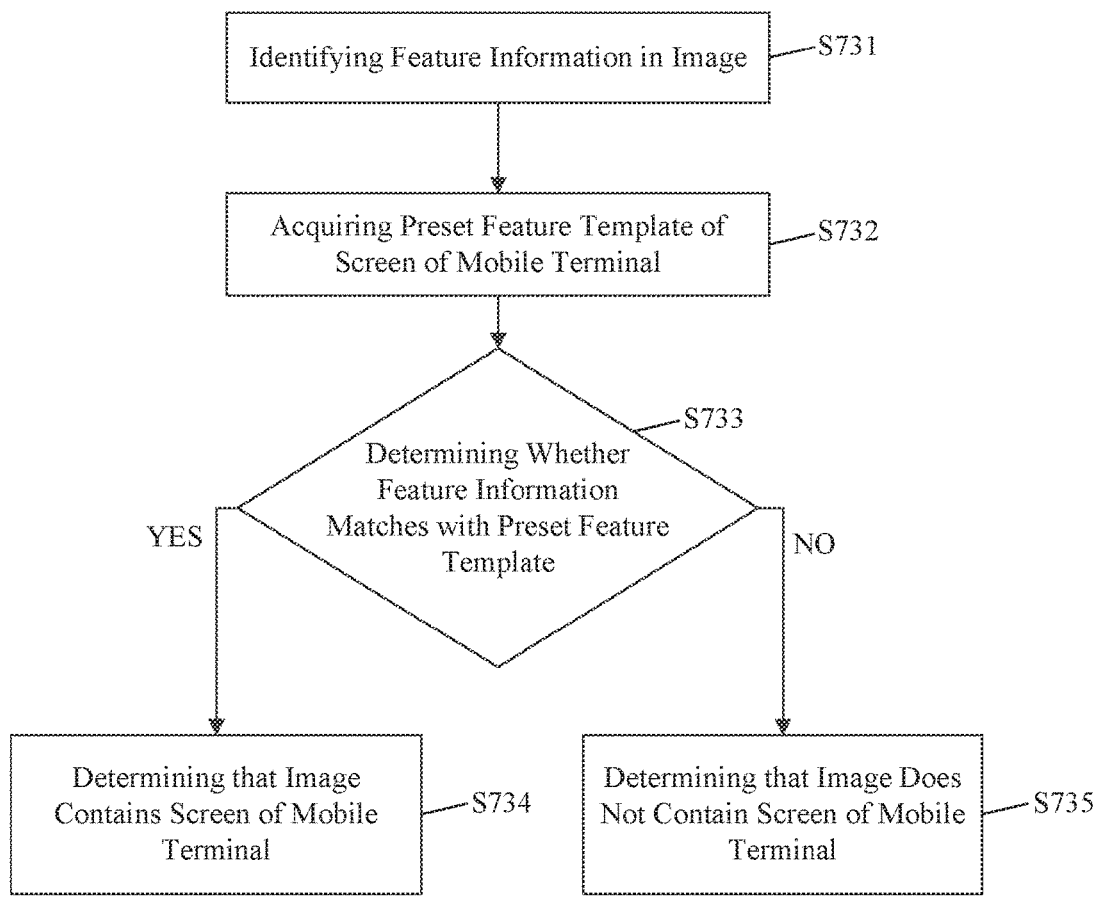
FIG. 9 is a flowchart of a method for detecting a screen of a mobile terminal, according to an exemplary embodiment.

FIG. 9 is a flowchart of a method 900 for detecting a screen of a mobile terminal, according to an exemplary embodiment. The method 900 may be performed by smart glasses and implemented in step S730 described in connection with FIG. 7. Referring to FIG. 9, the method 900 may include the following steps.

In step S731, the smart glasses identify feature information in the image.

For example, identifying feature information in the image captured by the smart glasses may be performed by using image preprocessing, area-of-interest identification, image feature identification, and so on.

In step S732, the smart glasses acquire a preset feature template of the screen of the mobile terminal.

The feature template of the screen of the mobile terminal may be preset and stored in a local database of the smart glasses. Various types of screen feature templates of the mobile terminal may be stored and may include features of the screen of the mobile terminal in different postures.

In step S733, the smart glasses determine whether the feature information matches the preset feature template of the screen of the mobile terminal.

A matching degree may be set. When the matching degree of the feature information and the feature template of the screen is greater than or equal to a preset threshold, it may be determined that the feature information matches the feature template of the screen, and vice versa.

When the feature information matches the feature template of the screen, step S734 is performed.

In step S734, the smart glasses determine that the image contains the screen of the mobile terminal. If the feature information matches the feature template of the screen, it may be determined that the image contains the screen of the mobile terminal, and that the user is looking at the mobile terminal screen.

When the feature information does not match the feature template of the screen, In step S735 is performed.

In step S735, the smart glasses determine that the image does not contain the screen of the mobile terminal. If the feature information is unmatched with the screen feature template, it may be determined that the image does not contain the screen of the mobile terminal and that the user is not looking at the mobile terminal screen.

Through the recognition of the image shot by the smart glasses, whether the image contains the screen feature of the mobile terminal may be accurately determined by a feature matching method, that is, whether the user is looking at or watching the mobile terminal screen may be determined.

Figure 10:
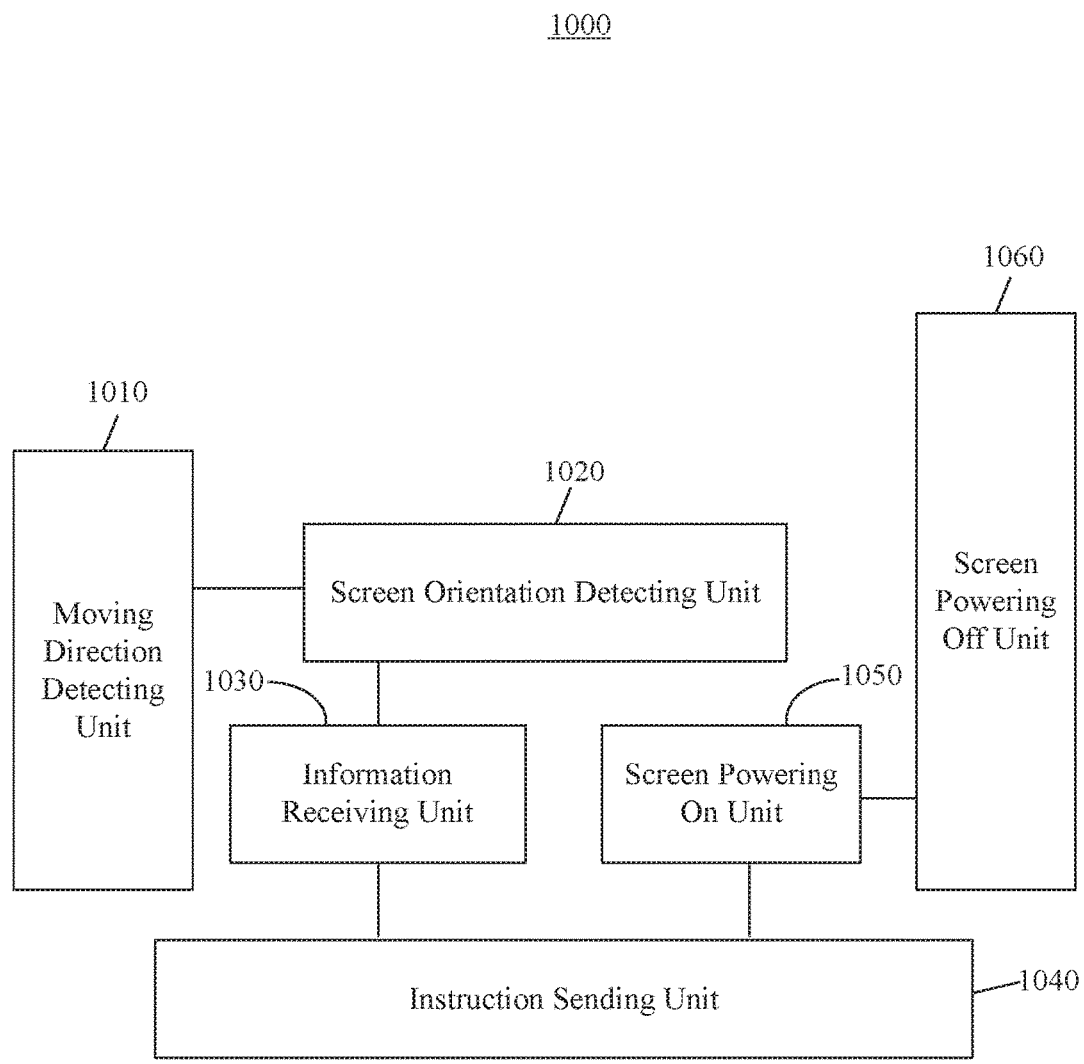
FIG. 10 is a block diagram of a device for screen control, according to an exemplary embodiment.

FIG. 10 is a block diagram of a device 1000 for screen control, according to an exemplary embodiment. The device 1000 may be implemented as a part or all of a mobile terminal. Referring to FIG. 10, the device 1000 includes a moving direction detecting unit 1010, a screen orientation detecting unit 1020, an information receiving unit 1030, an instruction sending unit 1040, a screen powering on unit 1050 and a screen powering off unit 1060.

The moving direction detecting unit 1010 is configured to detect a moving direction of the mobile terminal.

The screen orientation detecting unit 1020 is configured to detect an orientation of a screen of the mobile terminal.

The information receiving unit 1030 is configured to receive posture information sent by a wearable device.

The instruction sending unit 1040 is configured to send a screen recognition instruction to smart glasses when each of the moving direction, the orientation of the screen and a palm orientation in the posture information is in a first preset direction.

The screen powering on unit 1050 is configured to power on the mobile terminal screen when screen recognition success information sent by the smart glasses is received.

The screen powering off unit 1060 is configured to power off the mobile terminal screen when each of the moving direction, the orientation of the screen, and the palm orientation in the posture information is in a second preset direction, the first preset direction being different from the second preset direction.

In some embodiments, the first preset direction is an upward direction, and the second preset direction is a downward direction.

Figure 11:
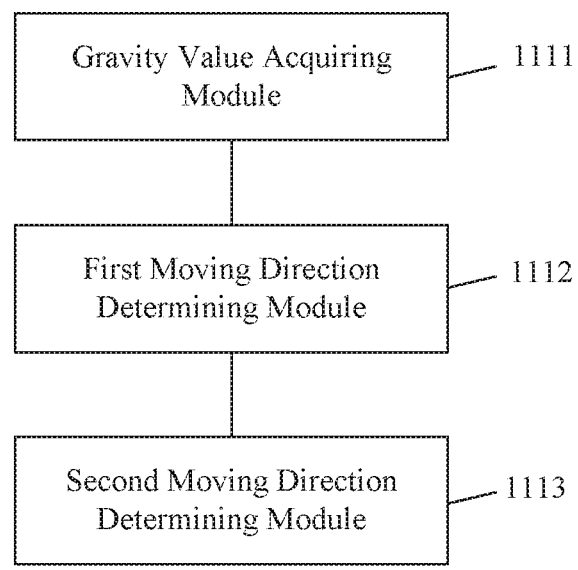
FIG. 11 is a block diagram of a moving direction detecting unit, according to an exemplary embodiment.

FIG. 11 is a block diagram of the moving direction detecting unit 1010, according to an exemplary embodiment. Referring to FIG. 11, the moving direction detecting unit 1010 includes a gravity value acquiring module 1111, a first moving direction determining module 1112 and a second moving direction determining module 1113.

The gravity value acquiring module 1111 is configured to acquire a gravity value detected by a gravity sensor in the mobile terminal.

The first moving direction determining module 1112 is configured to determine that the moving direction of the mobile terminal is the first preset direction when the gravity value is greater than a first preset threshold.

The second moving direction determining module 1113 is configured to determine that the moving direction of the mobile terminal is the second preset direction when the gravity value is less than a second preset threshold, the first preset threshold being greater than the second preset threshold.

Figure 12:
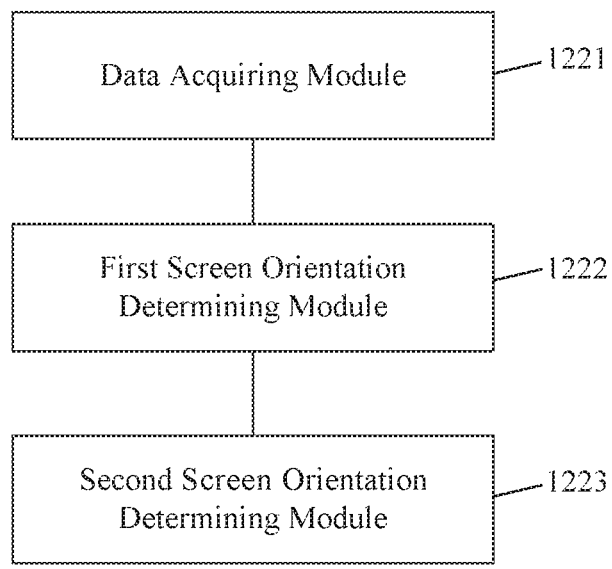
FIG. 12 is a block diagram of a screen orientation detecting unit, according to an exemplary embodiment.

FIG. 12 is a block diagram of the screen orientation detecting unit 1020, according to an exemplary embodiment. Referring to FIG. 12, the screen orientation detecting unit 1020 includes a data acquiring module 1221, a first screen orientation determining module 1222, and a second screen orientation determining module 1223.

The data acquiring module 1221 is configured to acquire a Z-axis gravity value detected by the gravity sensor in the mobile terminal.

The first screen orientation determining module 1222 is configured to determine that the orientation of the screen of the mobile terminal is in the first preset direction when the Z-axis gravity value is a positive value.

The second screen orientation determining module 1223 is configured to determine that the orientation of the screen of the mobile terminal is in the second preset direction when the Z-axis gravity value is a negative value.

Figure 13:
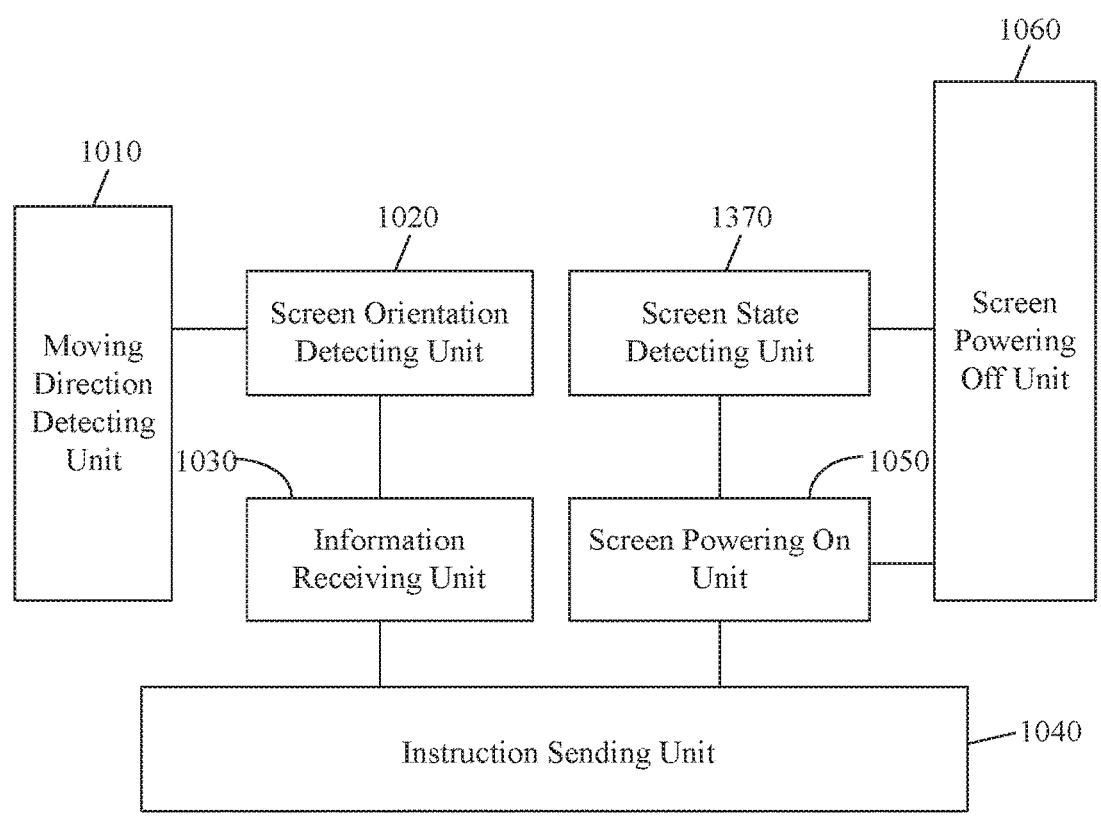
FIG. 13 is a block diagram of another device for screen control, according to an exemplary embodiment.

FIG. 13 is a block diagram of another device 1300 for screen control, according to an exemplary embodiment. The device 1300 may be implemented as a part or all of a mobile terminal. Referring to FIG. 13, in addition to the moving direction detecting unit 1010, screen orientation detecting unit 1020, information receiving unit 1030, instruction sending unit 1040, screen powering on unit 1050 and screen powering off unit 1060 (FIG. 10), the device 1300 further includes a screen state detecting unit 1370.

The screen state detecting unit 1370 is configured to detect a state of the screen of the mobile terminal.

The screen powering on unit 1050 is further configured to power on the screen of the mobile terminal when the screen of the mobile terminal is in the off state.

The screen powering off unit 1060 is further configured to power off the screen of the mobile terminal when the screen of the mobile terminal is in the on state.

Figure 14:
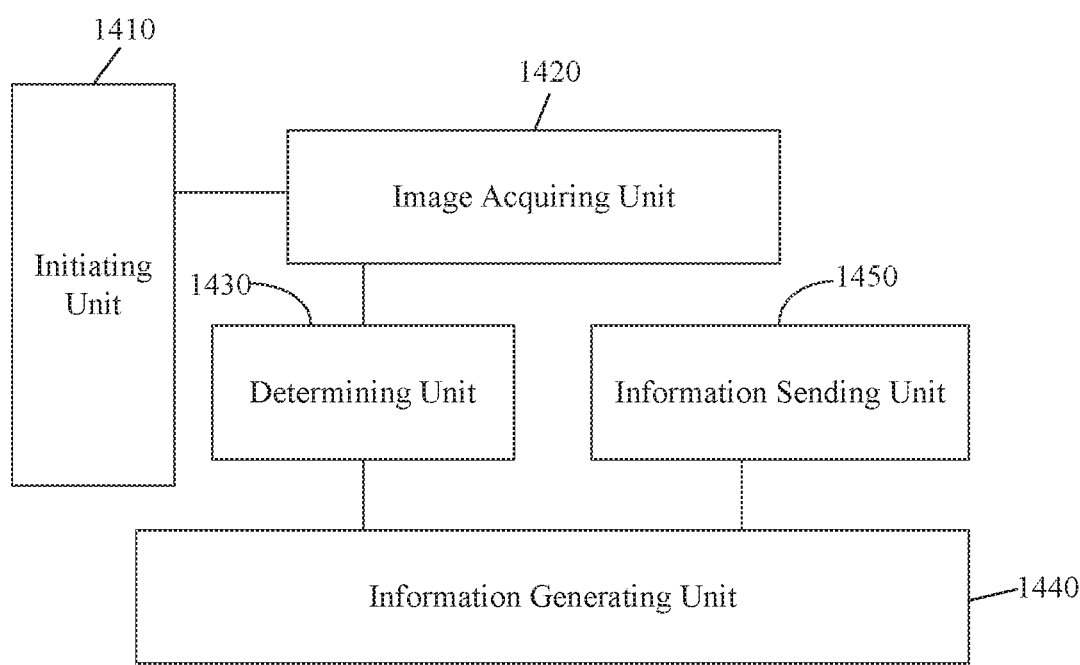
FIG. 14 is a block diagram of another device for screen control, according to an exemplary embodiment.

FIG. 14 is a block diagram of another device 1400 for screen control, according to an exemplary embodiment. The device 1400 may be implemented in smart glasses. Referring to FIG. 14, the device 1400 includes an initiating unit 1410, an image acquiring unit 1420, a determining unit 1430, an information generating unit 1440, and an information sending unit 1450.

The initiating unit 1410 is configured to initiate a screen recognition operation when a screen recognition instruction sent by a mobile terminal is received.

The image acquiring unit 1420 is configured to acquire an image within a field of view of the smart glasses.

The determining unit 1430 is configured to determine whether the image contains the screen of the mobile terminal.

The information generating unit 1440 is configured to generate screen recognition success information when the image contains the screen of the mobile terminal.

The information sending unit 1450 is configured to send the screen recognition success information to the mobile terminal.

Figure 15:
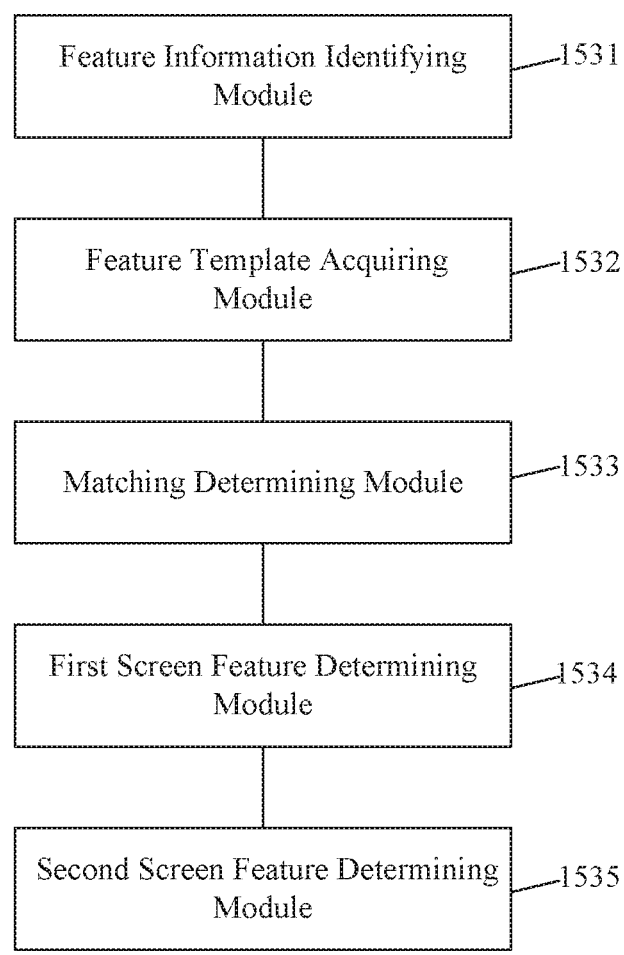
FIG. 15 is a block diagram of a determining unit, according to an exemplary embodiment.

FIG. 15 is a block diagram of the determining unit 1430, according to an exemplary embodiment. Referring to FIG. 15, the determining unit 1430 includes a feature information identifying module 1531, a feature template acquiring module 1532, a matching determining module 1533, a first screen feature determining module 1534, and a second screen feature determining module 1535, wherein The feature information identifying module 1531 is configured to identify feature information in the image.

The feature template acquiring module 1532 is configured to acquiring a preset feature template of the screen of the mobile terminal.

The matching determining module 1533 is configured to determine whether the feature information matches the preset feature template of the screen.

The first screen feature determining module 1534 is configured to determine that the image contains the screen feature of the mobile terminal when the feature information matches the preset feature template of the screen.

The second screen feature determining module 1535 is configured to determine that the image does not contain the feature of the screen of the mobile terminal when the feature information does not match the preset feature template of the screen.

Figure 16:
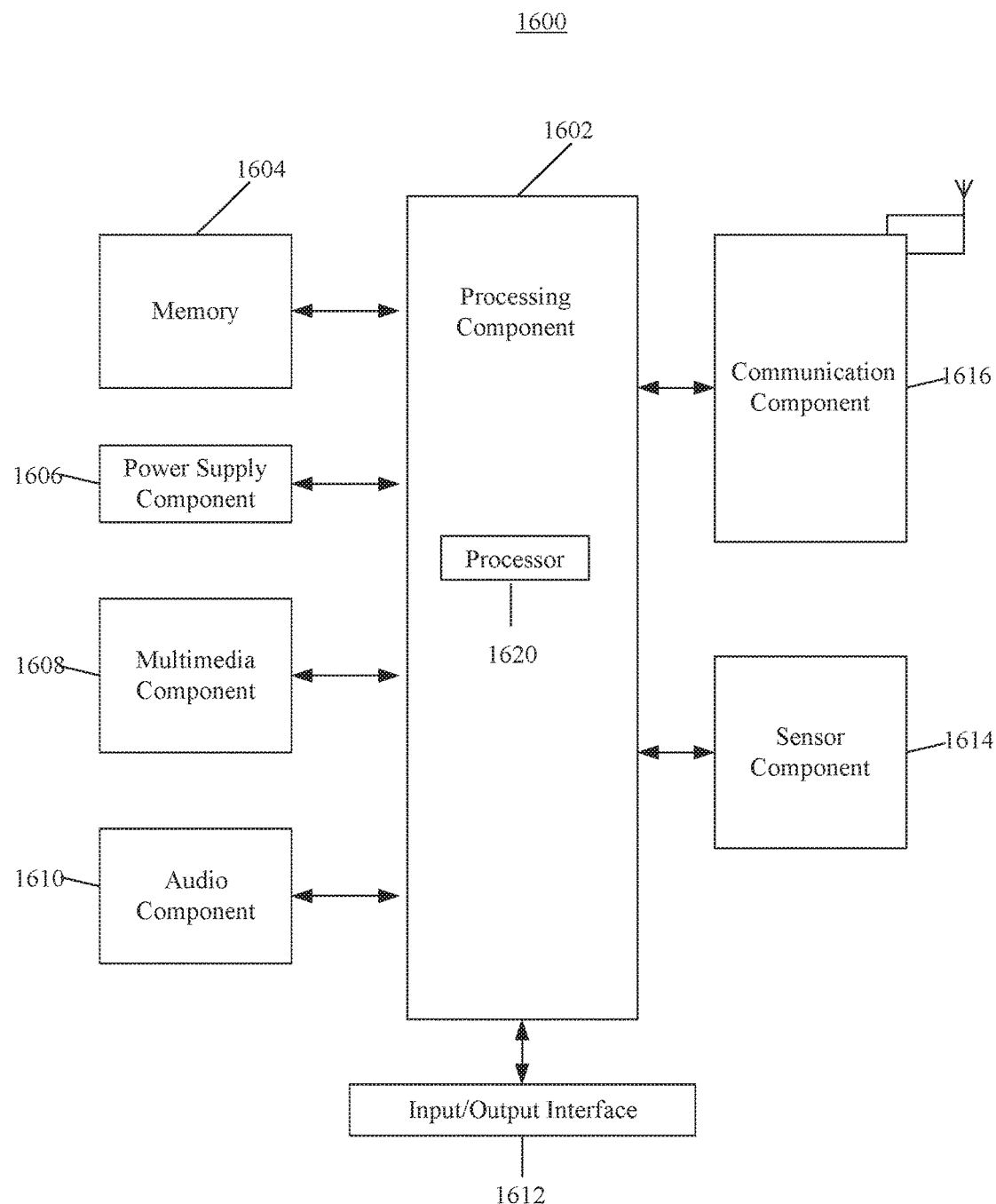
FIG. 16 is a block diagram of a mobile terminal, according to an exemplary embodiment.

FIG. 16 is a block diagram of a mobile terminal 1600, according to an exemplary embodiment. Fox example, the mobile terminal 1600 may be a mobile phone, smart glasses, a wearable device, a computer, a digital broadcast terminal, a message transceiver, a game console, a tablet device, a medical device, fitness equipment, a personal digital assistant (PDA), or the like.

Referring to FIG. 16, the mobile terminal 1600 may include one or more following components: a processing component 1602, a memory 1604, a power supply component 1606, a multimedia component 1608, an audio component 1610, an input/output (I/O) interface 1612, a sensor component 1614 and a communication component 1616. The person skilled in the art should appreciate that the structure of the mobile terminal 1600 as shown in FIG. 16 does not intend to limit the mobile terminal 1600. The mobile terminal 1600 may include more or less components or combine some components or other different components.

The processing component 1602 typically controls overall operations of the mobile terminal 1600, such as the operations associated with display, telephone calls, data communications, camera operations and recording operations. The processing component 1602 may include one or more processors 1620 to execute instructions to perform all or part of the steps in the above described methods. Moreover, the processing component 1602 may include one or more modules which facilitate the interaction between the processing component 1602 and other components. For example, the processing component 1602 may include a multimedia module to facilitate the interaction between the multimedia component 1608 and the processing component 1602.

The memory 1604 is configured to store various types of data to support the operation of the mobile terminal 1600. Examples of such data include instructions for any applications or methods operated on the mobile terminal 1600, contact data, phonebook data, messages, images, video, etc. The memory 1604 is also configured to store programs and modules. The processing component 1602 performs various functions and data processing by operating programs and modules stored in the memory 1604. The memory 1604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power supply component 1606 is configured to provide power to various components of the mobile terminal 1600. The power supply component 1606 may include a power supply management system, one or more power sources, and any other components associated with the generation, management, and distribution of power in mobile terminal 1600.

The multimedia component 1608 includes a screen providing an output interface between the mobile terminal 1600 and a user. In some embodiments, the screen may include a liquid crystal display (LCD) and/or a touch panel. If the screen includes the touch panel, the screen may be implemented as a touch screen to receive input signals from the user. The touch panel includes one or more touch sensors to sense touches, swipes and gestures on the touch panel. The touch sensors may not only sense a boundary of a touch or swipe action, but also sense a period of time and a pressure associated with the touch or swipe action. In some embodiments, the multimedia component 1608 includes a front camera and/or a rear camera. The front camera and/or the rear camera may receive an external multimedia datum while the mobile terminal 1600 is in an operation mode, such as a photographing mode or a video mode. Each of the front and rear cameras may be a fixed optical lens system or have a focus and optical zoom capability.

The audio component 1610 is configured to output and/or input audio signals. For example, the audio component 1610 includes a microphone configured to receive an external audio signal when the mobile terminal 1600 is in an operation mode, such as a call mode, a recording mode, and a voice recognition mode. The received audio signal may be further stored in the memory 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, buttons, and the like. The buttons may include, but are not limited to, a home button, a volume button, a starting button, and a locking button.

The sensor component 1614 includes one or more sensors to provide status assessments of various aspects of the mobile terminal 1600. For instance, the sensor component 1614 may detect an on/off state of the mobile terminal 1600, relative positioning of components, e.g., the display and the keypad, of the mobile terminal 1600, a change in position of the mobile terminal 1600 or a component of the mobile terminal 1600, a presence or absence of user's contact with the mobile terminal 1600, an orientation or an acceleration/deceleration of the mobile terminal 1600, and a change in temperature of the mobile terminal 1600. The sensor component 1614 may include a proximity sensor configured to detect the presence of nearby objects without any physical contact. The sensor component 1614 may also include a light sensor, such as a CMOS or CCD image sensor, for use in imaging applications. In some embodiments, the sensor component 1614 may also include an accelerometer sensor, a gravity sensor, a gyroscope sensor, a magnetic sensor, a pressure sensor or a temperature sensor.

The communication component 1616 is configured to facilitate communication, wired or wirelessly, between the mobile terminal 1600 and other devices. The mobile terminal 1600 may access a wireless network based on a communication standard, such as WiFi, 2Q or 3Q or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the mobile terminal 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1604, executable by the processor 1620 in the mobile terminal 1600, for performing the above-described methods. For example, the non-transitory computer-readable storage medium may be a ROM, a RAM, a CD-ROM, a magnetic tape, a floppy disc, an optical data storage device, and the like.

The above described embodiments may be used for numerous general or special computing system environments or configurations. Such as personal computers, server computers, handheld or portable devices, tablet-type devices, multiprocessor systems, microprocessor-based systems, set top boxes, programmable consumer electronic devices, network PCs, minicomputers, mainframe computers, distributed computing environments including the above systems or devices, and the like.

It should be understood by those skilled in the art that the above described modules/units can each be implemented through hardware, or software, or a combination of hardware and software. One of ordinary skill in the art will also understand that multiple ones of the above described modules/units may be combined as one module/unit, and each of the above described modules may be further divided into a plurality of sub-modules/sub-units.

It should be noted that, as used herein, relation terms such as "first", "second" and the like are used merely to distinguish a subject or an operation from another subject or another operation, and not to imply any substantial relation or order between these subjects or operations. Moreover, terms "include/comprise", "contain" or any variation thereof are intended to cover a nonexclusive containing, such that a process, a method, an item or a device containing a series of elements not only includes these elements, but also includes other elements that are not set forth specifically, or also includes an inherent element of such a process, method, item or device. Without further limitation, an element defined by a phrase "include/comprise" does not mean that other elements are excluded from the process, method, item or device including the same element.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A screen control method, comprising:
   detecting, by a mobile terminal, a moving direction of the mobile terminal;
   detecting, by the mobile terminal, an orientation of a screen of the mobile terminal;
   receiving, by the mobile terminal, posture information sent by a wearable device, the posture information including a palm orientation of a user of the mobile terminal;
   sending, by the mobile terminal, a screen recognition instruction to smart glasses when each of the moving direction, the orientation of the screen, and the palm orientation is in a first direction;
   powering on the screen when screen recognition success information sent by the smart glasses is received; and
   powering off the screen when each of the moving direction, the orientation of the screen, and the palm orientation is in a second direction, the second direction being different from the first direction.

2. The method of claim 1, wherein the first direction is an upward direction, and the second direction is a downward direction.

3. The method of claim 1, wherein detecting the moving direction of the mobile terminal comprises:
   acquiring a gravity value detected by a gravity sensor in the mobile terminal;
   determining that the moving direction of the mobile terminal is the first direction when the gravity value is greater than a first preset threshold; and
   determining that the moving direction of the mobile terminal is the second direction when the gravity value is less than a second preset threshold, the first preset threshold being greater than the second preset threshold.

4. The method of claim 1, wherein detecting the orientation of the screen comprises:
   acquiring a Z-axis gravity value detected by a gravity sensor in the mobile terminal;
   determining that the orientation of the screen is in the first direction when the Z-axis gravity value is a positive value; and
   determining that the orientation of the screen is in the second direction when the Z-axis gravity value is a negative value.

5. The method of claim 1, further comprising:
   detecting a state of the screen;
   performing the powering on the screen when the screen is in an off state; and
   performing the powering off the screen when the screen is in an on state.

6. The method of claim 1, wherein the wearable device includes a smart bracelet or a smart watch.

7. The method of claim 1, wherein the first direction is a direction towards a face of the user, and the second direction is a direction away from the face of the user.

8. The method of claim 1, wherein the screen recognition success information indicates a detection by the smart glasses that eyeballs of the user are looking at the mobile terminal.

9. A screen control method, comprising:
   initiating, by smart glasses, a screen recognition operation when a screen recognition instruction sent by a mobile terminal is received;
   acquiring, by the smart glasses, an image within a field of view of the smart glasses;
   determining, by the smart glasses, whether the image contains a screen of the mobile terminal, wherein determining whether the image contains the screen of the mobile terminal comprises:
      identifying feature information in the image;
      acquiring a preset feature template of the screen of the mobile terminal;
      determining whether the feature information matches the preset feature template;
      determining that the image contains the screen of the mobile terminal when the feature information matches the preset feature template; and
      determining that the image does not contain the screen of the mobile terminal when the feature information does not match the preset feature template;
   generating, by the smart glasses, screen recognition success information when the image contains the screen of the mobile terminal; and
   sending, by the smart glasses, the screen recognition success information to the mobile terminal.

10. A mobile terminal, comprising:
    a processor; and
    a memory configured to store instructions executable by the processor,
    wherein the processor is configured to:
    detect a moving direction of the mobile terminal;
    detect an orientation of a screen of the mobile terminal;

receive posture recognition information sent by a wearable device, the posture information including a palm orientation of a user of the mobile terminal;

send a screen recognition instruction to smart glasses when each of the moving direction, the orientation of the screen, and the palm orientation is in a first direction;

power on the screen when screen recognition success information sent by the preset smart glasses is received; and power off the screen when each of the moving direction, the orientation of the screen, and the palm orientation is in a second direction, the second preset direction being different from the first preset direction.

11. The mobile terminal of claim 10, wherein the first direction is an upward direction, and the second direction is a downward direction.

12. The mobile terminal of claim 10, wherein the processor is further configured to:

acquire a gravity value detected by a gravity sensor in the mobile terminal;

determine that the moving direction of the mobile terminal is the first direction when the gravity value is greater than a first preset threshold; and determine that the moving direction of the mobile terminal is the second direction when the gravity value is less than a second preset threshold, the first preset threshold being greater than the second preset threshold.

13. The mobile terminal of claim 10, wherein the processor is further configured to:

acquire a Z-axis gravity value detected by a gravity sensor in the mobile terminal;

determine that the orientation of the screen is in the first direction when the Z-axis gravity value is a positive value; and determine that the orientation of the screen is in the second direction when the Z-axis gravity value is a negative value.

14. The mobile terminal of claim 10, wherein the processor is further configured to:

detect a state of the screen;

perform the powering on the screen when the screen is in an off state; and perform the powering off the screen when the screen is in an on state.

15. The mobile terminal of claim 10, wherein the wearable device includes a smart bracelet or a smart watch.

16. The mobile terminal of claim 10, wherein the first direction is a direction towards a face of the user, and the second direction is a direction away from the face of the user.

17. The mobile terminal of claim 10, wherein the screen recognition success information indicates a detection by the smart glasses that eyeballs of the user are looking at the mobile terminal.

18. A smart terminal, comprising:

a processor; and a memory configured to store instructions executable by the processor, wherein the processor is configured to:

start a screen recognition operation when a screen recognition instruction sent by a mobile terminal is received;

acquire an image within a field of view of the smart terminal;

determine whether the image contains a screen of the mobile terminal, wherein in determining whether the image contains the screen of the mobile terminal, the processor is further configured to:

identify feature information in the image;

acquire a preset feature template of the screen of the mobile terminal;

determine whether the feature information matches the preset feature template;

determine that the image contains the screen of the mobile terminal when the feature information matches the preset feature template; and determine that the image does not contain the screen of the mobile terminal when the feature information does not match the preset feature template;

generate screen recognition success information when the image contains the screen of the mobile terminal; and send the screen recognition success information to the mobile terminal.

* * * * *